US012273697B2

(12) United States Patent
Jansen et al.

(10) Patent No.: US 12,273,697 B2
(45) Date of Patent: Apr. 8, 2025

(54) SYSTEMS AND METHODS FOR UPMIXING AUDIOVISUAL DATA

(71) Applicant: Google LLC, Mountain View, CA (US)

(72) Inventors: Aren Jansen, Mountain View, CA (US); Manoj Plakal, New York, NY (US); Dan Ellis, New York, NY (US); Shawn Hershey, Kirkland, WA (US); Richard Channing Moore, III, Brooklyn, NY (US)

(73) Assignee: GOOGLE LLC, Mountain View, CA (US)

( * ) Notice: Subject to any disclaimer, the term of this patent is extended or adjusted under 35 U.S.C. 154(b) by 139 days.

(21) Appl. No.: 18/042,258

(22) PCT Filed: Aug. 26, 2020

(86) PCT No.: PCT/US2020/047930
§ 371 (c)(1),
(2) Date: Feb. 20, 2023

(87) PCT Pub. No.: WO2022/046045
PCT Pub. Date: Mar. 3, 2022

(65) Prior Publication Data
US 2023/0308823 A1 Sep. 28, 2023

(51) Int. Cl.
*H04S 7/00* (2006.01)
*H04S 3/00* (2006.01)

(52) U.S. Cl.
CPC .......... *H04S 7/301* (2013.01); *H04S 2400/01* (2013.01)

(58) Field of Classification Search
CPC ..... H04S 7/00; H04S 3/00; H04S 5/00; H04S 7/301; H04S 2400/01; G06K 9/00; G11B 27/28; G11B 27/031

(Continued)

(56) References Cited

U.S. PATENT DOCUMENTS 11,321,542 B2   5/2022  Kalchbrenner et al.
2019/0306451 A1  10/2019  Wang et al.
(Continued)

FOREIGN PATENT DOCUMENTS

CN      111428015       7/2020
WO      WO2018/100244   6/2018
WO      WO 2019/229199  * 12/2019 ............... H04S 7/00

OTHER PUBLICATIONS

International Preliminary Report on Patentability for Application No. PCT/US2020/047930, mailed Mar. 9, 2023, 9 pages.
(Continued)

*Primary Examiner* — Yosef K Laekemariam
(74) *Attorney, Agent, or Firm* — DORITY & MANNING P.A.

(57) ABSTRACT

A computer-implemented method for upmixing audiovisual data can include obtaining audiovisual data including input audio data and video data accompanying the input audio data. Each frame of the video data can depict only a portion of a larger scene. The input audio data can have a first number of audio channels. The computer-implemented method can include providing the audiovisual data as input to a machine-learned audiovisual upmixing model. The audiovisual upmixing model can include a sequence-to-sequence model configured to model a respective location of one or more audio sources within the larger scene over multiple frames of the video data. The computer-implemented method can include receiving upmixed audio data from the audiovisual upmixing model. The upmixed audio data can have a second number of audio channels. The second number of audio channels can be greater than the first number of audio channels.

20 Claims, 7 Drawing Sheets

(58) Field of Classification Search
USPC .......................................... 381/80, 119, 303
See application file for complete search history.

(56) References Cited

U.S. PATENT DOCUMENTS

| | | |
|---|---|---|
| 2020/0258496 A1 | 8/2020 | Yang et al. |
| 2020/0372359 A1 | 11/2020 | Shaked et al. |
| 2021/0021949 A1* | 1/2021 | Sridharan ................ H04R 5/04 |
| 2021/0232705 A1 | 7/2021 | Chandelier et al. |

OTHER PUBLICATIONS

Anonymous, "Seq2seq—Wikipedia", Aug. 1, 2020, https://em/wikipedia.org/w/index.php?title=Seq2seq&oldid=970695786, retrieved Apr. 4, 2021, XP055797487.

International Search Report for Application No. PCT/US2020/047930, mailed on May 3, 2021, 3 pages.

Machine Translated Chinese Search Report Corresponding to Application No. 2020801024806 on Jan. 23, 2025.

Gao et al., "2.5D Visual Sound", IEEE/CVF Conference on Computer Vision and Pattern Recognition (CVPR), 2019, 10 pages.

Jianming Wu, "2.5D Visual Sound", 2019, https://www.cnblogs.com/wujianming-110117/p/12677563.html, retrieved on Mar. 5, 2025, 18 pages.

Vaswani et al., "Attention Is All You Need", arXiv:1706.03762v7, 15 pages.

Zhang et al., "Comprehensive 3D game design, game engine and game development case analysis", China Railway Publishing House, 5 pages.

* cited by examiner

SYSTEMS AND METHODS FOR UPMIXING AUDIOVISUAL DATA

PRIORITY CLAIM

This application is based upon and claims the right of priority under 35 U.S.C. § 371 to International Application No. PCT/US2020/047930 filed on Aug. 26, 2020, which is incorporated by reference herein.

FIELD

The present disclosure relates generally to systems and methods for upmixing audiovisual data. More particularly, the present disclosure relates to machine-learned models, such as sequence-to-sequence models, that are configured to produce upmixed audio data having a greater number of audio channels than input audio data.

BACKGROUND

Audio data can be represented in a variety of formats having varying degrees of quality and/or information. As one example, audio data can include information associated with one or more audio channels. For instance, an audio playback system can include (and/or simulate existence of) a plurality of playback devices that can use information from the audio channels to provide audio to a user in a manner that simulates audio sources in a surrounding environment. Audiovisual data including the audio data (e.g., audiovisual media) can be provided to a user for information, entertainment, and/or other suitable functions.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for upmixing audiovisual data. The computer-implemented method can include obtaining, by a computing system including one or more computing devices, audiovisual data including input audio data and video data accompanying the input audio data. Each frame of the video data can depict only a portion of a larger scene. The input audio data can have a first number of audio channels. The computer-implemented method can include providing, by the computing system, the audiovisual data as input to a machine-learned audiovisual upmixing model. The audiovisual upmixing model can include a sequence-to-sequence model configured to model a respective location of one or more audio sources within the larger scene over multiple frames of the video data. The computer-implemented method can include receiving, by the computing system, upmixed audio data from the audiovisual upmixing model. The upmixed audio data can have a second number of audio channels. The second number of audio channels can be greater than the first number of audio channels.

Another example aspect of the present disclosure is directed to a computing system configured for upmixing audiovisual data. The computing system can include one or more processors and one or more memory devices storing computer-readable data including instructions that, when implemented, cause the one or more processors to perform operations. The operations can include obtaining audiovisual data including input audio data and video data accompanying the input audio data. The input audio data can have a first number of audio channels. The operations can include providing the audiovisual data as input to a machine-learned audiovisual upmixing model. The audiovisual upmixing model can include a sequence-to-sequence model. The operations can include receiving upmixed audio data from the audiovisual upmixing model. The upmixed audio data can have a second number of audio channels. The second number of audio channels can be greater than the first number of audio channels.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
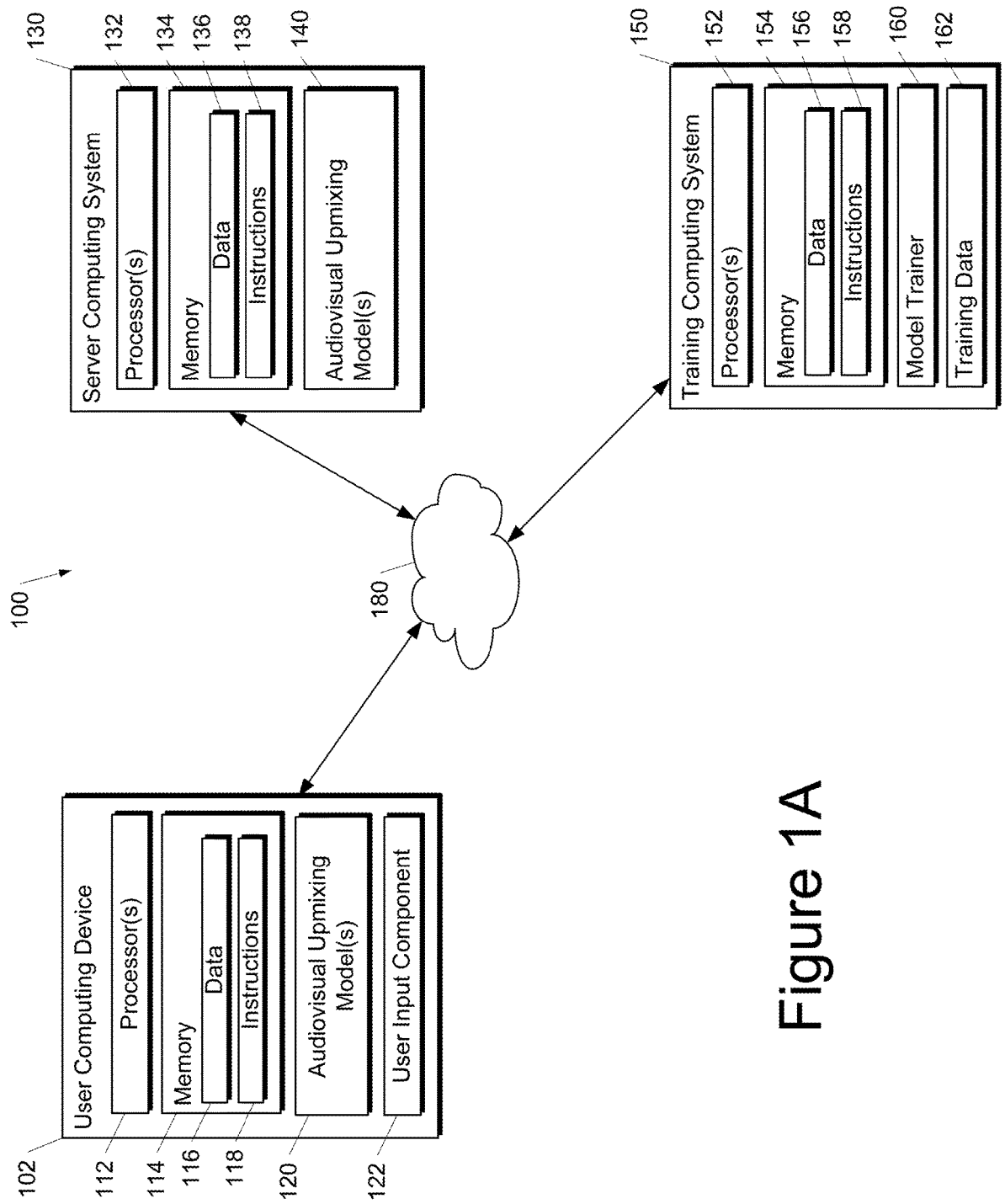
FIG. 1A depicts a block diagram of an example computing system that performs audiovisual upmixing according to example embodiments of the present disclosure.

Reference numerals that are repeated across plural figures are intended to identify the same features in various implementations.

DETAILED DESCRIPTION

Generally, the present disclosure is directed to systems and methods for upmixing audiovisual data. For instance, the systems and methods can employ one or more machine-learned models, such as a sequence-to-sequence model, to upmix audio data in audiovisual data including audio data and accompanying video data, such as two-dimensional video data. The two-dimensional video data can allow the machine-learned model(s) to learn spatial characteristics associated with the audio data and produce audiovisual embeddings that reflect the spatial characteristics of at least a portion of video data and audio characteristics of corresponding audio data. For instance, the audiovisual embeddings can be used (e.g., by the machine-learned model) to produce upmixed audio data. The upmixed audio data can have a greater number of audio channels than the original audio data. For example, the audio data can be upmixed from mono audio (e.g., audio data having one audio channel) to stereo audio (e.g., audio data having two audio channels, such as a left and right audio channel). As another example, the audio data can be upmixed from mono and/or stereo audio to surround sound audio data having three or more audio channels, such as six audio channels (e.g., 5.1-audio channel), such as greater than five audio channels. As another example, surround sound audio data with a lower number of audio channels can be upmixed to surround sound audio with a greater number of audio channels.

The systems and methods described herein can provide for upmixing of mono and/or stereo audio associated with two-dimensional video data (e.g., video data captured from a two-dimensional camera), such as video data represented as a plurality of pixels, where each pixel has a position in a two-dimensional array of pixels. For example, many professionally- and/or amateur-created video media (e.g., shared on video sharing websites) includes two-dimensional video and mono or stereo audio, as this form of media can be easy to capture using common equipment (e.g., mobile phones, video cameras, etc.).

Upmixing audio data associated with two-dimensional video can present challenges, as two-dimensional video data can provide an incomplete understanding of an environment of the two-dimensional video that is conventionally necessary to create a surround sound experience. For example, surround sound audio creation may conventionally require understanding of a three-dimensional space associated with a camera perspective from which the video data is captured, such as directions associated with audio sources. As one example, surround sound audio can be captured by a plurality of microphones having known and/or correlation positions around a set or recording space. When such information is unavailable, such as in two-dimensional video having mono or stereo audio, and/or other low-dimension or low-audio channel audio, it can be difficult to accurately produce upmixed audio data. For example, it may be difficult or impossible to accurately place audio data sourced from stationary and/or moving objects, such as stationary and/or moving off-screen objects (e.g., environmental sounds, etc.), which may be necessary or at least beneficial in producing surround sound audio. Furthermore, a more complete spatial awareness associated with three-dimensional video may not be present in two-dimensional video, further complicating production of upmixed audio data.

For instance, the audiovisual data may be or include incomplete video data. That is, the video data may provide an incomplete understanding of an acoustic environment. An example of this may be where the video data comprises two-dimensional video data. For example, the video data may be captured by a two-dimensional camera.

For incomplete video data, each frame of the video data depicts a scene that comprises only a portion of a larger scene. For example, the frames of the video data may be or include a plurality of boundaries. The boundaries may define the extent of the scene, where the larger scene extends beyond the boundaries. The boundaries may be defined by the physical limitations or settings of a recording device used to capture the audiovisual data, such as a camera. The boundaries may, in some examples, comprise generally vertical boundaries, e.g. the video data may not provide a 360 degree view in the horizontal plane.

In contrast to the video data, recorded audio data will generally capture sound from the larger scene. For example, in a first time period both the video data and audio data may comprise an object generating sound (e.g. a camera and microphone may capture a car driving along a road). In a second time period, the object may have moved out of the boundary of the video data (e.g. the car may drive past the camera and out of shot of the camera). However, the sound generated by the object will still be recorded, and hence be present in the audio data.

Systems and methods according to example aspects of the present disclosure can provide solutions for these and other problems by employing a machine-learned model, such as a sequence-to-sequence machine-learned model (e.g., an encoder-decoder model, transformer model, etc.) to produce an audiovisual embedding based on correlated audiovisual data. For instance, the correlated audiovisual data can include audio data having a first number of audio channels, such as fewer than three audio channels, and corresponding video data, such as video data including a sequence of video frames (e.g., images). The systems and methods according to example aspects of the present disclosure can thus produce audiovisual embeddings that include understanding of spatial characteristics of the audiovisual data. For example, the systems and methods can produce a sequence of audiovisual embeddings for each input recording (e.g., audio data). The audiovisual embeddings can be used to produce upmixed audio data. For instance, a video and/or other audiovisual media including mono and/or stereo audio can be converted into a video and/or other audiovisual media including surround sound audio according to example aspects of the present disclosure. For example, the surround sound audio data can provide audio signals at a number of channels for spatially varied playback devices, which can play audio for a user in a manner that improves user experience, such as simulates the audio originating at a location that may be elsewhere than the playback devices (e.g., corresponding to locations of an object in video data). For example, an audio signal at two or more channels may include an audio signature associated with a same audio event (e.g., a particular sound effect, spoken word, etc.) such that a user perceives the audio event as originating from a space other than the playback devices. The systems and methods can notably perform this upmixing even for two-dimensional video data which may provide only a limited understanding of an audio context.

In addition to being useful for producing upmixed audio data, the audiovisual embeddings may be used for sound separation tasks, sound localization tasks, semantic analysis tasks, and other suitable audio localization tasks that can be improved by spatial understanding. For example, the audiovisual embeddings may be fed to a sound separation model, a sound localization model, a semantic analysis model, or another suitable task model, such as a machine-learned model.

According to example aspects of the present disclosure, a computing system can include one or more processors. The one or more processors can be configured to perform operations for implementing a computer-implemented method of upmixing audiovisual data. For instance, the computing system can include one or more memory devices storing computer-readable data including instructions that, when implemented, cause the one or more processors to perform the operations. The computing system can be or can include one or more computing devices, such as one or more computing devices including some or all of the one or more processors. As one example, the computing system can include a server computing system, a client computing system (e.g., a personal computing device), a mobile device (e.g., a smartphone, tablet computer, media player, etc.), and/or any other suitable computing system including any suitable computing device(s).

In some implementations, the operations can be implemented as an application layer in a program or application, such as provided between a first layer configured to produce or otherwise provide the audiovisual data and/or a second layer configured to provide the audiovisual data to the user. As another example, in some implementations, the operations can be implemented consecutively with creation, storage, upload, and/or other transfer of audiovisual media. For example, the audiovisual media may be created and/or transferred with low-audio channel audio data and, during creation and/or transfer, the operations can be implemented to produce upmixed audio data to be provided with and/or alternatively to the low-audio channel audio data. For example, the upmixed audio data may be stored with the low-audio channel audio data in a video upload service and/or video streaming service such that a user can select the upmixed audio data as a playback option.

The operations and/or the computer implemented method can include obtaining (e.g., by a computing system including one or more computing devices) audiovisual data. The audiovisual data can include audio data and video data accompanying the audio data. For example, the audio data and/or the video data can be correspondingly time-divided. For instance, in some implementations, the audio data can be or can include a spectrogram. For instance, the spectrogram can include information relating frequency and/or intensity with respect to time. In some implementations, the audio data can include a spectrogram for each of one or more audio channels in the audio data. The audiovisual data can be obtained in real-time (e.g., from one or more recording devices), from a file (e.g., a media file), and/or in any other suitable manner.

The video data can be or can include any suitable format of computer-readable data that facilitates video playback to a user. For example, the video data can include a sequence of a plurality of video frames. The video frames can be images, such as RGB images, CMYK images, and/or any other suitable images. Additionally and/or alternatively, the video data can be stored in any suitable format, such as file formats that provide compression of the video data, such as, for example, MP4 format (e.g., mp4, m4a, etc.), WMV format, OGG format, MOV format, and/or any other suitable format. In some implementations, the video file format can additionally be configured to store audio data. In some implementations, the video data can be or can include two-dimensional video data (e.g., video data captured from a two-dimensional camera), such as video data represented as a plurality of pixels, where each pixel has a position in a two-dimensional array of pixels.

Additionally and/or alternatively, the operations and/or the computer-implemented method can include providing (e.g., by the computing system) the audiovisual data to an audiovisual upmixing model. The audiovisual upmixing model can be configured to receive audiovisual data (e.g., audio data and/or accompanying video data) and, in response to receipt of the audiovisual data, produce upmixed audio data based on the audiovisual data. For instance, the operations and/or the computer-implemented method can include, in response to providing the audiovisual data to the audiovisual upmixing model, receiving, (e.g., by the computing system), upmixed audio data from the audiovisual upmixing model.

The upmixed audio data can have a greater number of audio channels than audio data included as part of the audiovisual data. For example, the upmixed audio data can be provided to an audio playback system including a plurality of playback devices (e.g., and/or configured to simulate a plurality of playback devices) where each playback device is associated with a unique audio channel. As another example, the upmixed audio data can be stored (e.g., along with the video data) as a media file, such as an audiovisual media file. For instance, the audiovisual upmixing model can be configured to produce upmixed audio data directly based on audiovisual data, which can provide solutions to complications associated with explicitly instantiating coordinate systems and other requirements for object localization tasks, sound separation tasks, etc. For instance, use of the audiovisual upmixing model can avoid requiring an explicit (e.g., explicitly instantiated, such as by a coordinate system) 360-degree understanding of the audio data.

An audio channel can be or include a suitable medium for conveying an audio signal to one or more playback devices, such as speakers, headphones, etc. For example, an audio channel can be or can include a wire or other isolated signal communication medium. As another example, an audio channel can be or include logical divisions in a signal including a plurality of channels, such as a multiplexed signal. Audio data can include data associated with a plurality of audio channels, such as a unique audio signal (e.g., a unique spectrogram) associated with each channel that the audio data is configured for. For example, during playback of audio data including data associated with multiple audio channels, audio data for each channel can be (e.g., independently) fed to a unique playback device (e.g., a speaker) such that each playback device outputs distinct sound.

The audio channels for the original audio data and/or the upmixed audio data can each be complete audio channels and/or can be or include partial audio channels. For example, the upmixed audio data may be 5.1-channel audio data that includes five channels having a full frequency band and a sixth channel with a limited frequency band (e.g., used for effects).

Additionally and/or alternatively, the channels may be associated with a known spatial configuration. For example, single-channel audio data (e.g., mono audio) may be provided to each playback device regardless of spatial orientation, which may be beneficial to convey complete audio data to a user whether a user is listening on one playback device or many (e.g., only listening to a single headphone of a pair). As another example, dual-channel audio data (e.g., stereo audio) may include one channel generally associated with a left side relative to a point of observation (e.g., a television screen, front of headphones, etc.) and be configured to provide audio to the left of the user (e.g., at a playback device left of the point of the observation) while a second channel may be associated with a right side.

Additionally, 5.1-channel systems can include audio data having a front left channel, a front right channel, a center channel, a left surround channel, a right surround channel, and/or a low-frequency effects channel (e.g., for a subwoofer). While the data may not necessarily be provided to a user from playback devices arranged in this convention, the audio data will generally convey an acoustic environment to a user as intended by the audio data if provided to playback devices matching this configuration. Other suitable audio data configurations including any suitable number of channels can be employed in accordance with example aspects of the present disclosure.

The audiovisual upmixing model can include one or more input streams and/or output streams. For example, in some implementations, the audiovisual upmixing model can include one input stream for each channel of input data, such as one stream for each audio channel of the input audio data and a stream for the video data. As another example, the audiovisual upmixing model can include one output stream for each channel of the upmixed audio data. For instance, an audiovisual upmixing model configured to convert two-channel stereo audio to 5.1-channel surround sound audio may include two input streams for the two-channel audio data, an input stream for video data, and six output streams for the 5.1-channel surround sound audio data.

By using both the audio data and accompanying video data as input data, the audiovisual upmixing model can learn correspondence between locations of (e.g., sound-producing) objects in the video data and corresponding audio signals in the audio data. This correspondence can be useful in reconstructing upmixed soundscapes (e.g., surround sound audio data) from the audio signals. For example, the audiovisual upmixing model can learn, based on the video data, information relating to sound-producing objects on screen. Additionally, the audiovisual upmixing model can make informed predictions for off-screen objects, such as predictions based on where an object was last seen or is about to enter.

In some implementations, the model can be constrained to require continuity in object location (e.g., relative to a fixed perspective in video data). For example, constraining continuity in object location can assist the model in providing reasonable source location assignments for objects in the video data. The constraints may be implemented as a limit on potential changes in state vectors and/or outputs, for example.

The audiovisual upmixing model can be machine-learned (e.g., be or include one or more machine-learned model(s)). For instance, the audiovisual upmixing model can be a self-supervised machine-learned model. In some implementations, the audiovisual upmixing model can be or can include a (e.g., machine-learned) sequence-to-sequence model. A sequence-to-sequence model can be a model that is configured to take a first sequence of data (e.g., audiovisual data) and produce, based on the first sequence of data, a second sequence of data (e.g., upmixed audio data). As examples, the sequence-to-sequence model can be or can include an encoder-decoder model, neural network(s) (e.g., recursive neural networks (RNNs), convolutional neural networks (CNNs), etc.), long short-term memory (LSTM) model, Transformer model, gated recurrent units (GRU) model, and/or other suitable sequence-to-sequence models or portions thereof.

The sequence-to-sequence model can be configured to model a respective location of one or more audio sources within the larger scene over multiple frames of the video data. For instance, the sequence-to-sequence model (e.g., encoder-decoder) can map the input audiovisual data to a latent time-series vector representation of the data, which can be used in generating each output channel. For example, the sequence-to-sequence model can intuitively factor locations of objects throughout a scene in the video data, even when the objects are offscreen. This can assist the model in constructing accurate upmixed audio data that preserves spatial consistency of moving or off-screen objects, ambient audio in the scene that is sourced from objects behind the camera, etc.

As one example, the audiovisual upmixing model can be or can include an encoder-decoder model, such as an encoder-decoder model including one or more neural networks (e.g., recursive neural networks, convolutional neural networks, linear networks, etc.). For example, the encoder-decoder model can capture contextual information of the input data (e.g., the audiovisual data) as an internal state vector (e.g., an embedding) by providing the input data to an encoder submodel. For instance, in some embodiments, the encoder submodel can include an input channel (e.g., a separate mapping neural network) for each input sequence. For example, the encoder submodel can include separate and/or correlated input channels (e.g., separate neural networks) for audio data and video data included in audiovisual data. Including correlated input channels can allow for the audiovisual upmixing model to learn contextual information present in the video data and associated with the audio data, which can be beneficial for upmixing audio data, especially for two-dimensional video data.

The internal state vector can be provided to a decoder submodel to produce output data (e.g., upmixed audio data) based on the internal state vector. The internal state vector can additionally preserve information from a previous state (e.g., previous input in a sequence), which can allow the sequence-to-sequence model to learn historical information of the input data (e.g., previous visual entities in video data that may be offscreen in a current video frame). The submodels (e.g., the encoder submodel and/or the decoder submodel) can include neural networks, such as recursive neural networks.

In some implementations, the audiovisual upmixing model can include an attention mechanism. The attention mechanism can be configured to allow the audiovisual upmixing model to observe a window of input data, such as more than one entry of input data in a sequence of input data. For example, the window can be a temporal window (e.g., a subset of the sequence of input data). As an example, such as in implementations where the audiovisual upmixing model is an encoder-decoder model, the attention mechanism can include more than one internal state vector that are each provided to the decoder submodel. Additionally and/or alternatively, the attention mechanism can include one or more context vectors. For example, the context vectors can be one or more weighted sums of the internal state vectors. Including a plurality of context vectors and/or internal state vectors can provide deeper understanding of the audiovisual data, including understanding over a longer sequence of time (e.g., to remember information associated with off-screen objects previously in a scene). The context vector can be combined with the internal state vectors and used in place of a single internal state vector (e.g., provided as input to the decoder submodel). Additionally and/or alternatively, the attention mechanism can include an alignment model (e.g., a machine-learned model) that is configured to provide an attention score for an input internal state vector. For example, the attention score can be provided by the alignment model for a particular internal state vector (e.g., combined with a context vector) to determine how important a particular input data entry associated with the internal state vector is.

For example, in some implementations, the audiovisual upmixing model can produce low-dimensional embeddings (e.g., embeddings having fewer than 100 dimensions) of the input audiovisual data. For example, such as in implementations having an encoder-decoder model with an attention mechanism, the embeddings may be produced by the encoder submodel. These embeddings can encode useful information about correlated audio and visual events (e.g., sound with location of a corresponding sound-producing object). The embeddings may be provided to a task-specific machine-learned model (e.g., task-specific layers, such as neural network layers) for various audio tasks that are spatially sensitive. As one example, the embeddings may be provided as input to a sound separation model that produces isolated audio signals, where the encoded video information can be beneficial in separating audio sources. As another example, the embeddings may be provided to a sound source localization model to localize a sound source, where the encoded video information may be beneficial in localizing sound sources. For example, the embeddings may be useful in performing partial and/or complete annotation tasks of high quality audiovisual scenes.

Additionally and/or alternatively, in some implementations, the audiovisual upmixing model can be configured to receive supplementary data associated with the audiovisual data. The supplementary data can be or can include data that supplements audio and/or video data in the audiovisual data. As one example, the supplementary data can include object detection data (e.g., from an object detection model) that is associated with the video data, such as object boundaries (e.g., bounding boxes), object classifications, object tracking (e.g., object trajectories, such as predicted trajectories), camera tracking information, and/or any other suitable supplementary data. In some implementations, however, the audiovisual upmixing model can learn to upmix audio data without requiring this supplementary data, which can be beneficial in reducing additional data processing requirements to derive the supplementary data and/or in cases where such data is unavailable (e.g., for offscreen objects in two-dimensional video). For example, the audiovisual upmixing model can jointly learn to upmix audio data with regard to object detection and tracking (e.g., to upmix audio data with regard to spatial features) without requiring a separate model for these tasks and/or instantiation and/or transfer of data that provides information on these tasks.

Additionally and/or alternatively, systems and methods according to example aspects of the present disclosure can provide for training an audiovisual upmixing model. For instance, a computing system including one or more computing devices can be configured to train the audiovisual upmixing model on training data. The model may be trained at a same location (e.g., a same address in memory, a same computing device, etc.) at which the model operates at inference time, and/or may be trained at a first computing system (e.g., a training computing system) and transferred to a separate second computing system subsequent to training and/or prior to inference time. For instance, training the audiovisual upmixing model can include obtaining (e.g., by a computing system having one or more computing devices), audiovisual training data including video training data and audio training data having the second number of audio channels, downmixing (e.g., by the computing system) the audio training data to produce downmixed audio training data including the first number of audio channels, providing (e.g., by the computing system) the video training data and corresponding downmixed audio training data to the audiovisual upmixing model, obtaining (e.g., by the computing system) a predicted upmixed audio data output having the second number of audio channels from the audiovisual upmixing model, determining (e.g., by the computing system) a difference between the predicted upmixed audio data and the audio training data, and updating (e.g., by the computing system) one or more parameters of the model based the difference.

For example, training the audiovisual upmixing model can include obtaining (e.g., by a computing system including one or more computing devices) training data including audiovisual training data. The audiovisual training data can be or can include video data and/or higher-channel audio data that accompanies the video data. For instance, the audiovisual training data can include a plurality (e.g., thousands or greater) of video media entities, such as professional and/or amateur videos, that include higher-channel audio data, such as surround sound audio. The higher-channel audio data can include data associated with a plurality of audio channels, such as a first number of audio channels. For instance, the higher-channel audio data can be surround sound higher-channel audio data having greater than three audio channels (e.g., six audio channels), such as a number of channels that is desired for the audiovisual upmixing model to output.

Training the audiovisual upmixing model can additionally and/or alternatively include downmixing (e.g., by the computing system), the audio data of the audiovisual training data to produce downmixed audio data. Unlike upmixing audio data, which can typically require predictions to fill in data associated with a higher number of channels, downmixing audio data can typically be performed deterministically, such as by rules, heuristics, protocols, etc. For example, downmixing surround sound audio and/or stereo audio to mono audio may simply include combining each of a plurality of audio channels on a single audio channel.

As one example, downmixing audio data can include obtaining higher-channel audio data having a first number of channels to be downmixed to lower-channel audio data having a second number of channels. For each audio channel of the higher-channel audio data, a corresponding channel of the lower-channel audio data, such as a closest (e.g., spatially closest) channel, can be selected, and audio data from the audio channel of the higher-channel audio data can be associated with the corresponding channel of the lower-channel audio data. For instance, one or more audio channels of the higher-channel audio data may be combined on a single audio channel of the lower-channel audio data.

The audiovisual upmixing model can be trained by providing the video data and corresponding downmixed audio data to the audiovisual upmixing model. For example, the original higher-channel audio data can be used as an expected output of the audiovisual upmixing model, and predicted higher-channel audio data from the audiovisual upmixing model can be evaluated against the original higher-channel audio data. For example, a loss used to train the model (e.g., by backpropagation) can be based on a difference between the original and predicted higher-channel audio data. For example, the loss function may include regression towards complex spectrograms. As another example, the loss function may include regression towards magnitude spectrograms, which may be input to introgressive waveform reconstruction systems.

Aspects of the present disclosure can provide for a number of technical effects and benefits. For example, aspects of the present disclosure can enable upmixing of audio data with accompanying video data even in cases where the video data provides incomplete understanding of an acoustic environment, such as, for example, in cases where the video data is two-dimensional.

For instance, aspects of the present disclosure can provide for improvements to computing technologies. For example, aspects of the present disclosure can improve computing technology by obtaining audiovisual data including input audio data and video data accompanying the input audio data, the input audio data having a first number of audio channels, providing the audiovisual data as input to a machine-learned audiovisual upmixing model, and receiving upmixed audio data from the audiovisual upmixing mode having a second number of audio channels, the second number of audio channels greater than the first number of audio channels. For instance, this can provide for an improved representation of the input audio data having a greater number of audio channels, which can allow computing systems utilizing the audio data (e.g., for audio playback) to provide an improved user listening experience, such as improved spatial diversity in audio events.

With reference now to the Figures, example embodiments of the present disclosure will be discussed in further detail.

FIG. 1A depicts a block diagram of an example computing system 100 that performs audiovisual upmixing according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more audiovisual upmixing models 120. For example, the audiovisual upmixing models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example audiovisual upmixing models 120 are discussed with reference to FIGS. 2-3.

In some implementations, the one or more audiovisual upmixing models 120 can be received from the server computing system 130 over network 180, stored in the user computing device memory 114, and then used or otherwise implemented by the one or more processors 112. In some implementations, the user computing device 102 can implement multiple parallel instances of a single audiovisual upmixing model 120 (e.g., to perform parallel audiovisual upmixing across multiple instances of audiovisual upmixing services).

More particularly, the audiovisual upmixing model can be configured to receive audiovisual data (e.g., audio data and/or accompanying video data) and, in response to receipt of the audiovisual data, produce upmixed audio data based on the audiovisual data. For instance, the operations and/or the computer-implemented method can include, in response to providing the audiovisual data to the audiovisual upmixing model, receiving, (e.g., by the computing system), upmixed audio data from the audiovisual upmixing model.

The upmixed audio data can have a greater number of audio channels than audio data included as part of the audiovisual data. For example, the upmixed audio data can be provided to an audio playback system including a plurality of playback devices (e.g., and/or configured to simulate a plurality of playback devices) where each playback device is associated with a unique audio channel. As another example, the upmixed audio data can be stored (e.g., along with the video data) as a media file, such as an audiovisual media file. For instance, the audiovisual upmixing model can be configured to produce upmixed audio data directly based on audiovisual data, which can provide solutions to complications associated with explicitly instantiating coordinate systems and other requirements for object localization tasks, sound separation tasks, etc. For instance, use of the audiovisual upmixing model can avoid requiring a 360-degree understanding of the audio data.

Additionally or alternatively, one or more audiovisual upmixing models 140 can be included in or otherwise stored and implemented by the server computing system 130 that communicates with the user computing device 102 according to a client-server relationship. For example, the audiovisual upmixing models 140 can be implemented by the server computing system 140 as a portion of a web service (e.g., an audiovisual upmixing service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned audiovisual upmixing models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-3.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the audiovisual upmixing models 120 and/or 140 based on a set of training data 162. The training data 162 can include, for example, audiovisual training data. The audiovisual training data can be or can include video data and/or higher-channel audio data that accompanies the video data. For instance, the audiovisual training data can include a plurality (e.g., thousands or greater) of video media entities, such as professional and/or amateur videos, that include higher-channel audio data, such as surround sound audio. The higher-channel audio data can include data associated with a plurality of audio channels, such as a first number of audio channels. For instance, the higher-channel audio data can be surround sound higher-channel audio data having greater than three audio channels (e.g., six audio channels), such as a number of channels that is desired for the audiovisual upmixing model to output.

Additionally and/or alternatively, the training data can include downmixed audio data that is downmixed from the higher-channel audio data. For instance, the video data and corresponding downmixed audio data to the audiovisual upmixing model. For example, the original higher-channel audio data can be used as an expected output of the audiovisual upmixing model, and predicted higher-channel audio data from the audiovisual upmixing model can be evaluated against the original higher-channel audio data. For example, a loss used to train the model (e.g., by backpropagation) can be based on a difference between the original and predicted higher-channel audio data. For example, the loss function may include regression towards complex spectrograms. As another example, the loss function may include regression towards magnitude spectrograms, which may be input to introgressive waveform reconstruction systems.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases, such as, for example, audiovisual upmixing, sound separation and/or isolation, etc.

In some implementations, the input to the machine-learned model(s) of the present disclosure can be image data (e.g., image frames of video data including a plurality of image frames). The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upmixed image data output. As another example, the machine-learned model(s) can process the image data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes video data (e.g. one or more images or videos), the output comprises compressed video data, and the task is a video data compression task. In another example, the task may comprise generating an embedding for input data (e.g. input audio or video data).

In some cases, the input includes video data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
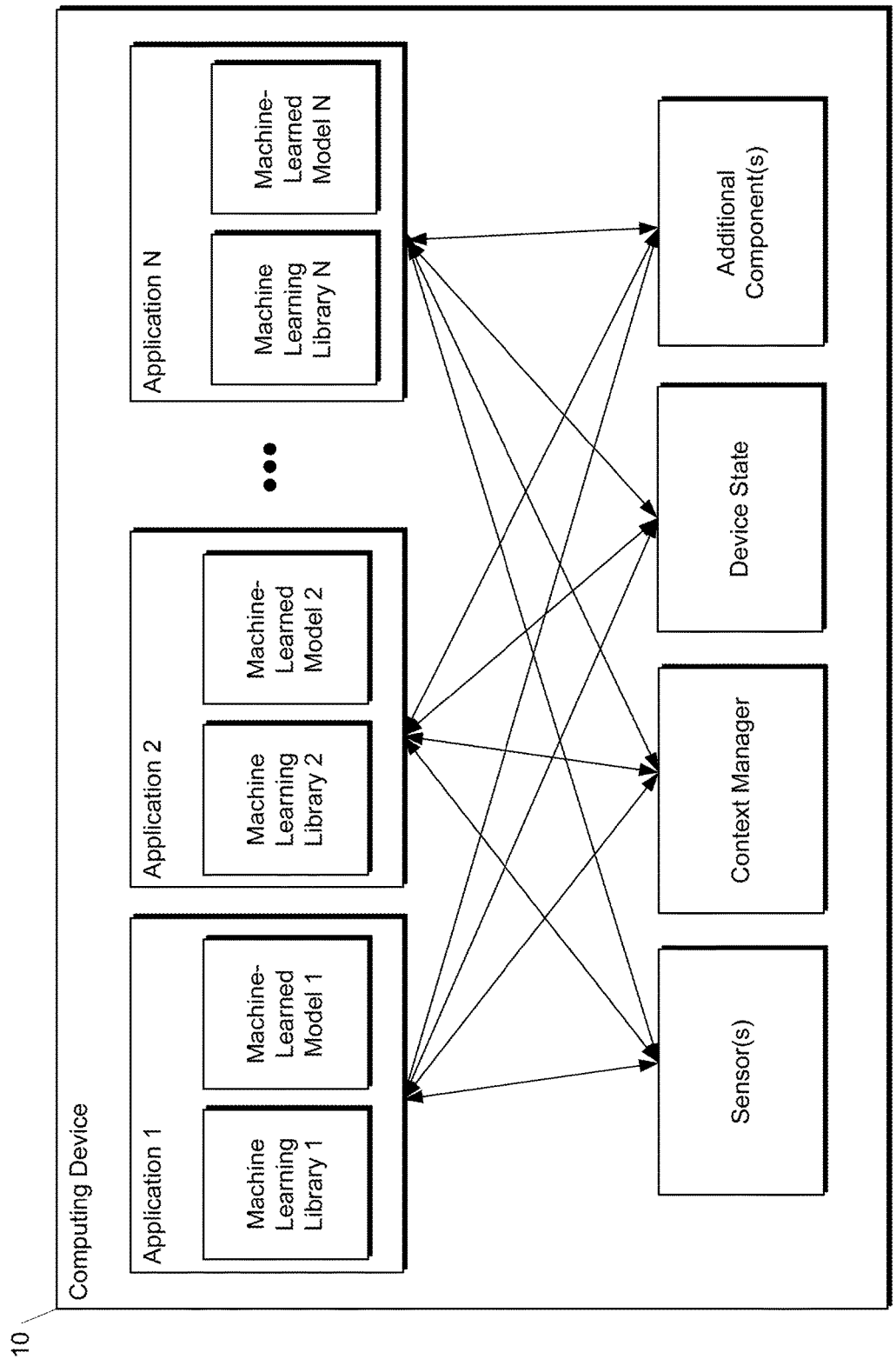
FIG. 1B depicts a block diagram of an example computing device that performs audiovisual upmixing according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
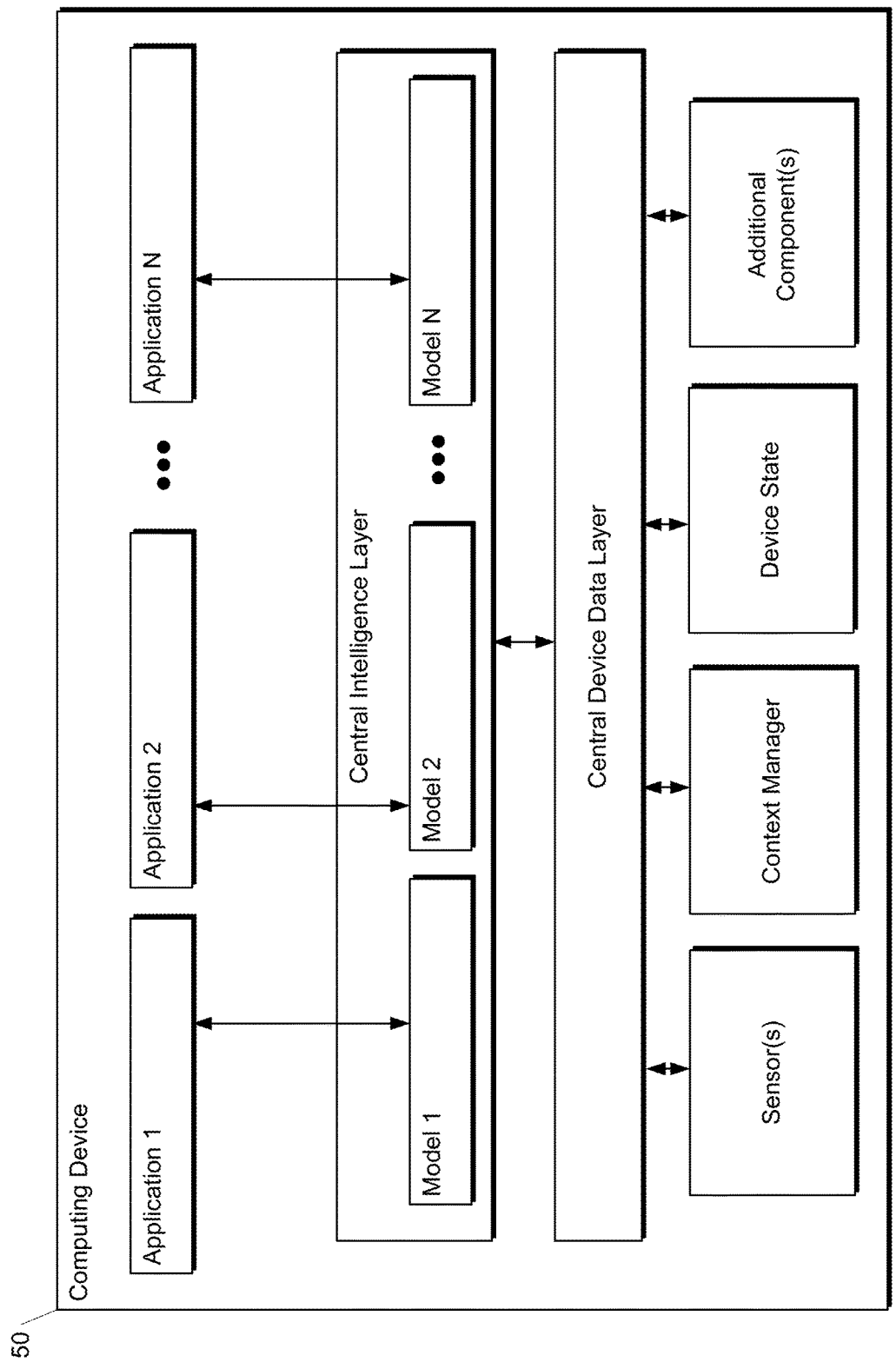
FIG. 1C depicts a block diagram of an example computing device that performs audiovisual upmixing according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 2:
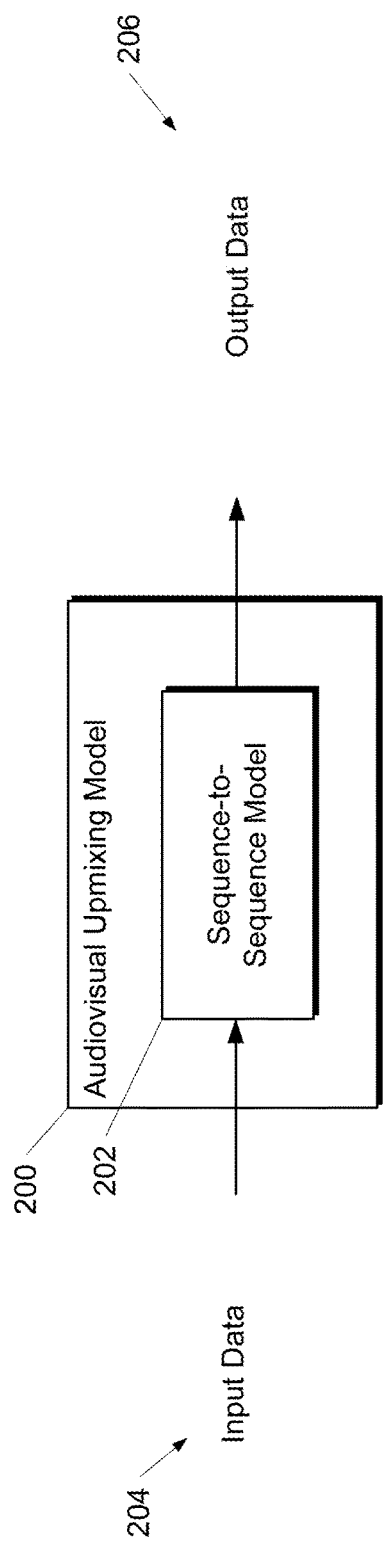
FIG. 2 depicts a block diagram of an example audiovisual upmixing model according to example embodiments of the present disclosure.

FIG. 2 depicts a block diagram of an example audiovisual upmixing model 200 according to example embodiments of the present disclosure. In some implementations, the audiovisual upmixing model 200 is trained to receive a set of input data 204 descriptive of audiovisual data, such as audio data (e.g., one or more spectrograms) and/or accompanying video data (e.g., one or more image frames of video data) and, as a result of receipt of the input data 204, provide output data 206 that includes upmixed audio data having a greater number of channels than the input audio data. Thus, in some implementations, the audiovisual upmixing model 200 can include a sequence-to-sequence model 202, such as, for example, an encoder-decoder model, transformer model, etc. that is operable to upmix the audio data to have a greater number of channels, where arrangement of audio data among the channels is based on the accompanying video data.

Figure 3:
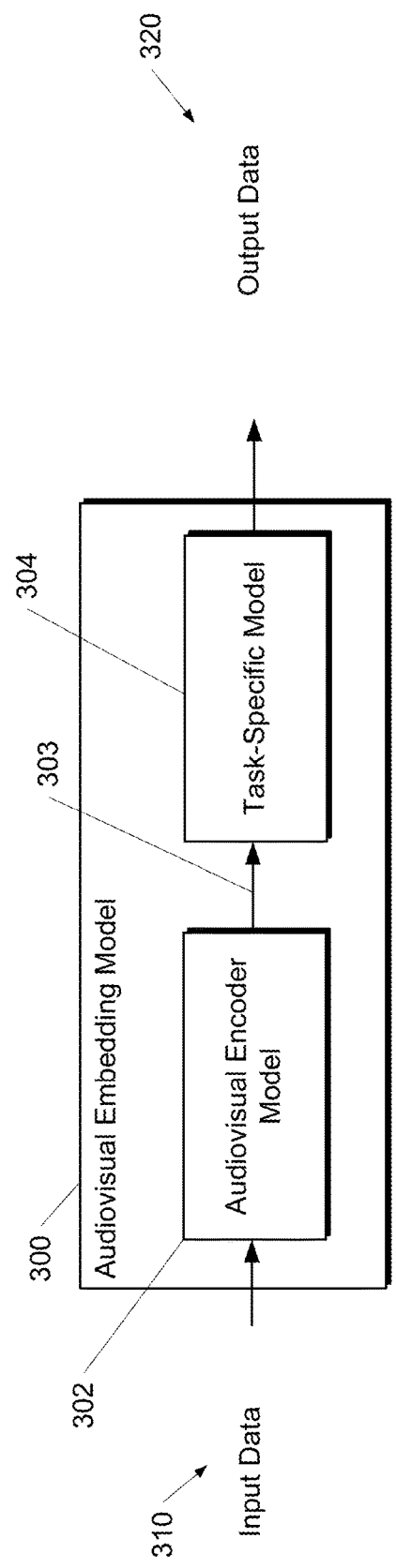
FIG. 3 depicts a block diagram of an example audiovisual embedding model according to example embodiments of the present disclosure.

FIG. 3 depicts a block diagram of an example audiovisual embedding model 300 according to example embodiments of the present disclosure. The audiovisual embedding model 300 can include audiovisual encoder model 302. The audiovisual encoder model 302 can be configured to produce one or more audiovisual embeddings 303 based on input data 310. Input data 310 can include audiovisual data (e.g., audio data and/or video data). The audiovisual encoder model 302 can produce the embeddings 303 that encode information present in the input data 310. For instance, the audiovisual encoder model 302 can be an encoder similar to and/or identical to the encoder submodel in an audiovisual upmixing model described herein. For example, an encoder submodel from a trained audiovisual upmixing model may be separated from other components of the audiovisual upmixing model (such as a decoder submodel) and used in the audiovisual embedding model 300. Additionally to and/or alternatively to the embeddings 303 being provided to a decoder submodel or other upmixing model, the embeddings can be provided to a task-specific model 304 configured to produce task-specific output data 320 based on the embeddings 303. For instance, the task-specific model 304 may be a sound separation model, sound source localization model, etc.

Figure 4:
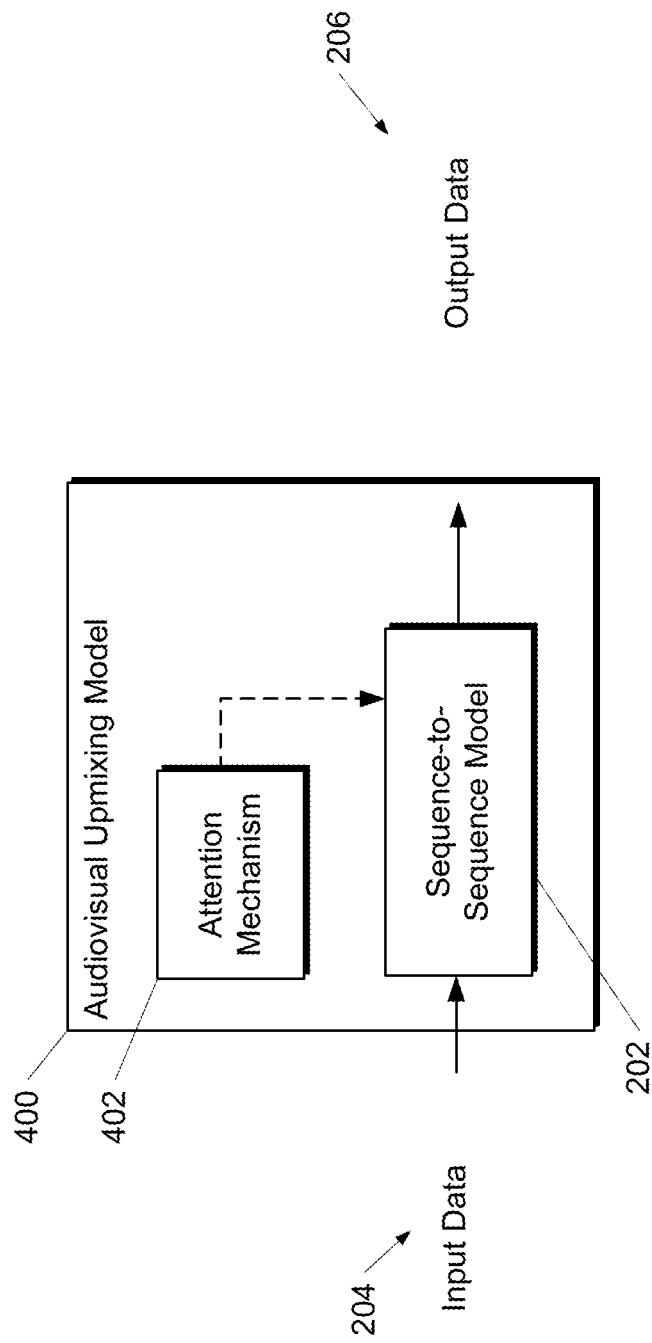
FIG. 4 depicts a block diagram of an example audiovisual upmixing model according to example embodiments of the present disclosure.

FIG. 4 depicts a block diagram of an example audiovisual upmixing model 400 according to example embodiments of the present disclosure. The audiovisual upmixing model 400 is similar to the audiovisual upmixing model 200 of FIG. 2 and further includes an attention mechanism 402. The attention mechanism 402 can be configured to allow the audiovisual upmixing model 400 to observe a window of input data, such as more than one entry of input data in a sequence of input data. For example, the window can be a temporal window (e.g., a subset of the sequence of input data). As an example, such as in implementations where the audiovisual upmixing model 400 (e.g., the sequence-to-sequence model 402) is an encoder-decoder model, the attention mechanism 402 can include more than one internal state vector that are each provided to the decoder submodel. Additionally and/or alternatively, the attention mechanism 402 can include one or more context vectors. For example, the context vectors can be one or more weighted sums of the internal state vectors. Including a plurality of context vectors and/or internal state vectors can provide deeper understanding of the audiovisual data, including understanding over a longer sequence of time (e.g., to remember information associated with off-screen objects previously in a scene). The context vector can be combined with the internal state vectors and used in place of a single internal state vector (e.g., provided as input to the decoder submodel). Additionally and/or alternatively, the attention mechanism 402 can include an alignment model (e.g., a machine-learned model) that is configured to provide an attention score for an input internal state vector. For example, the attention score can be provided by the alignment model for a particular internal state vector (e.g., combined with a context vector) to determine how important a particular input data entry associated with the internal state vector is.

Figure 5:
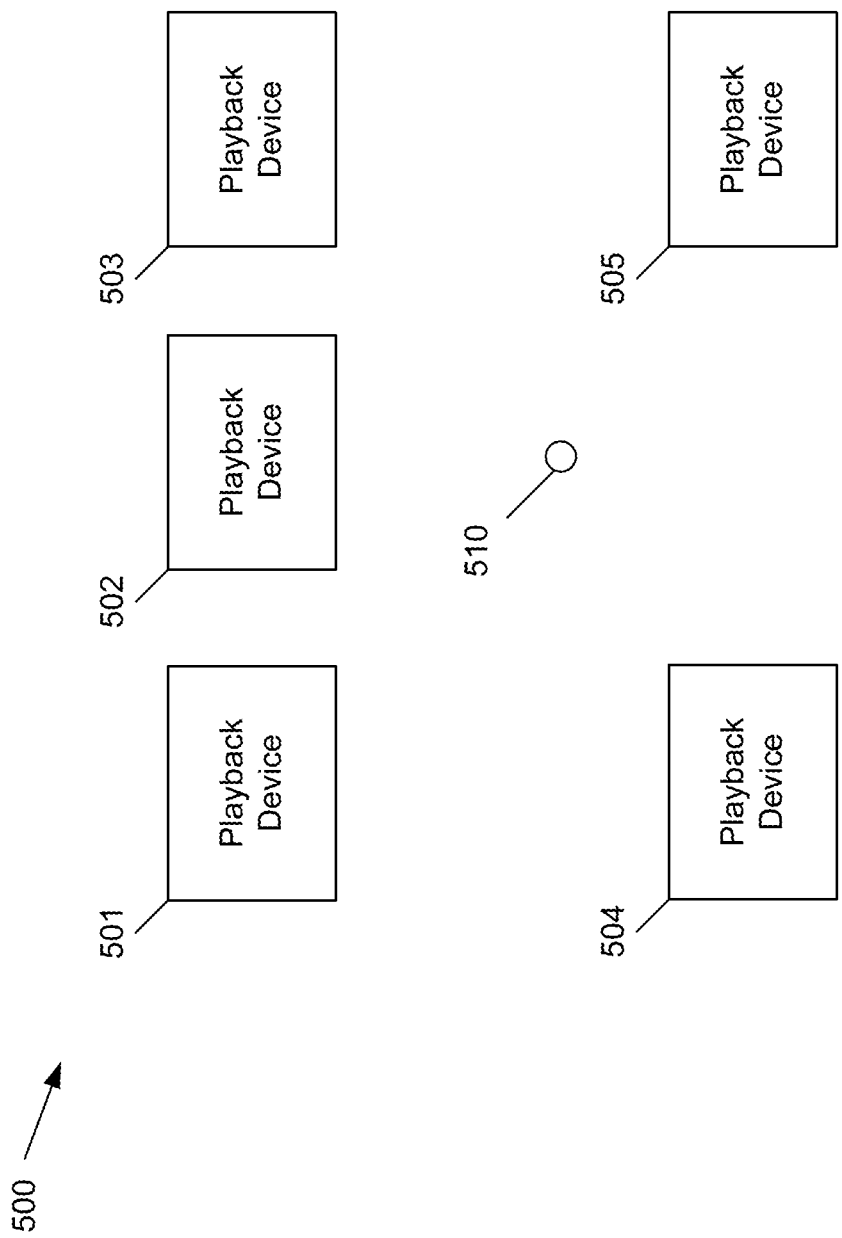
FIG. 5 depicts a block diagram of an example surround sound environment according to example embodiments of the present disclosure.

FIG. 5 depicts a block diagram of an example surround sound environment 500 according to example embodiments of the present disclosure. For instance, upmixed audio data may be configured to be played on playback devices that are arranged according to surround sound environment 500. For example, surround sound environment 500 can be arranged according to a listening area 510. Surround sound environment 500 can include playback devices 501-505 that each are configured to play a unique audio channel of surround sound audio data. For instance, upon the playback devices 501-505 playing a unique audio channel of surround sound audio data, a user or other listening entity at or near listening area 510 may be provided with an improved listening experience, such as a listening experience that mimics directions associated with sound-producing objects in video data. For instance, the surround sound environment 500 can be a 5.1-channel surround sound environment including a front left channel for front left playback device 501, a center channel for center playback device 502, a front right channel for front right playback device 503, a surround left channel for surround left playback device 504, and a surround right channel for surround right playback device 505.

Figure 6:
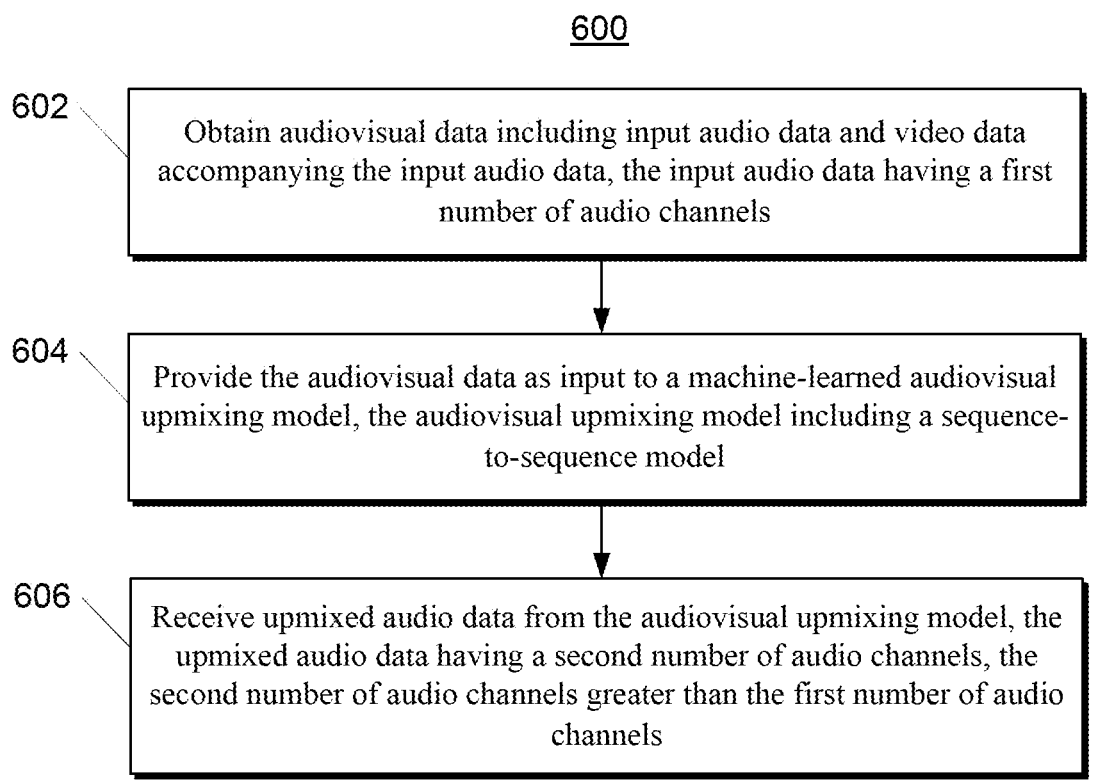
FIG. 6 depicts a flow chart diagram of an example method to perform audiovisual upmixing according to example embodiments of the present disclosure.

FIG. 6 depicts a flow chart diagram of an example method to perform audiovisual upmixing according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

The computer implemented method 600 can include, at 602 obtaining (e.g., by a computing system including one or more computing devices) audiovisual data. The audiovisual data can include audio data and video data accompanying the audio data. For example, the audio data and/or the video data can be correspondingly time-divided. For instance, in some implementations, the audio data can be or can include a spectrogram. For instance, the spectrogram can include information relating frequency and/or intensity with respect to time. In some implementations, the audio data can include a spectrogram for each of one or more audio channels in the audio data. The audiovisual data can be obtained in real-time (e.g., from one or more recording devices), from a file (e.g., a media file), and/or in any other suitable manner.

The video data can be or can include any suitable format of computer-readable data that facilitates video playback to a user. For example, the video data can include a sequence of a plurality of video frames. The video frames can be images, such as RGB images, CMYK images, and/or any other suitable images. Additionally and/or alternatively, the video data can be stored in any suitable format, such as file formats that provide compression of the video data, such as, for example, MP4 format (e.g., mp4, m4a, etc.), WMV format, OGG format, MOV format, and/or any other suitable format. In some implementations, the video file format can additionally be configured to store audio data. In some implementations, the video data can be or can include two-dimensional video data (e.g., video data captured from a two-dimensional camera), such as video data represented as a plurality of pixels, where each pixel has a position in a two-dimensional array of pixels.

Additionally and/or alternatively, the computer-implemented method 600 can include, at 604, providing (e.g., by the computing system) the audiovisual data to an audiovisual upmixing model. The audiovisual upmixing model can be configured to receive audiovisual data (e.g., audio data and/or accompanying video data) and, in response to receipt of the audiovisual data, produce upmixed audio data based on the audiovisual data. For instance, the computer-implemented method 600 can include, at 606, in response to providing the audiovisual data to the audiovisual upmixing model, receiving, (e.g., by the computing system), upmixed audio data from the audiovisual upmixing model.

The upmixed audio data can have a greater number of audio channels than audio data included as part of the audiovisual data. For example, the upmixed audio data can be provided to an audio playback system including a plurality of playback devices (e.g., and/or configured to simulate a plurality of playback devices) where each playback device is associated with a unique audio channel. As another example, the upmixed audio data can be stored (e.g., along with the video data) as a media file, such as an audiovisual media file. For instance, the audiovisual upmixing model can be configured to produce upmixed audio data directly based on audiovisual data, which can provide solutions to complications associated with explicitly instantiating coordinate systems and other requirements for object localization tasks, sound separation tasks, etc. For instance, use of the audiovisual upmixing model can avoid requiring a 360-degree understanding of the audio data.

An audio channel can be or include a suitable medium for conveying an audio signal to one or more playback devices, such as speakers, headphones, etc. For example, an audio channel can be or can include a wire or other isolated signal communication medium. As another example, an audio channel can be or include logical divisions in a signal including a plurality of channels, such as a multiplexed signal. Audio data can include data associated with a plurality of audio channels, such as a unique audio signal (e.g., a unique spectrogram) associated with each channel that the audio data is configured for. For example, during playback of audio data including data associated with multiple audio channels, audio data for each channel can be (e.g., independently) fed to a unique playback device (e.g., a speaker) such that each playback device outputs distinct sound.

The audio channels for the original audio data and/or the upmixed audio data can each be complete audio channels and/or can be or include partial audio channels. For example, the upmixed audio data may be 5.1-channel audio data that includes five channels having a full frequency band and a sixth channel with a limited frequency band (e.g., used for effects).

Additionally and/or alternatively, the channels may be associated with a known spatial configuration. For example, single-channel audio data (e.g., mono audio) may be provided to each playback device regardless of spatial orientation, which may be beneficial to convey complete audio data to a user whether a user is listening on one playback device or many (e.g., only listening to a single headphone of a pair).

As another example, dual-channel audio data (e.g., stereo audio) may include one channel generally associated with a left side relative to a point of observation (e.g., a television screen, front of headphones, etc.) and be configured to provide audio to the left of the user (e.g., at a playback device left of the point of the observation) while a second channel may be associated with a right side.

Additionally, 5.1-channel systems can include audio data having a front left channel, a front right channel, a center channel, a left surround channel, a right surround channel, and/or a low-frequency effects channel (e.g., for a subwoofer). While the data may not necessarily be provided to a user from playback devices arranged in this convention, the audio data will generally convey an acoustic environment to a user as intended by the audio data if provided to playback devices matching this configuration. Other suitable audio data configurations including any suitable number of channels can be employed in accordance with example aspects of the present disclosure.

The audiovisual upmixing model can include one or more input streams and/or output streams. For example, in some implementations, the audiovisual upmixing model can include one input stream for each channel of input data, such as one stream for each audio channel of the input audio data and a stream for the video data. As another example, the audiovisual upmixing model can include one output stream for each channel of the upmixed audio data. For instance, an audiovisual upmixing model configured to convert two-channel stereo audio to 5.1-channel surround sound audio may include two input streams for the two-channel audio data, an input stream for video data, and six output streams for the 5.1-channel surround sound audio data.

By using both the audio data and accompanying video data as input data, the audiovisual upmixing model can learn correspondence between locations of (e.g., sound-producing) objects in the video data and corresponding audio signals in the audio data. This correspondence can be useful in reconstructing upmixed soundscapes (e.g., surround sound audio data) from the audio signals. For example, the audiovisual upmixing model can learn, based on the video data, information relating to sound-producing objects on screen. Additionally, the audiovisual upmixing model can make informed predictions for off-screen objects, such as predictions based on where an object was last seen or is about to enter.

In some implementations, the model can be constrained to require continuity in object location (e.g., relative to a fixed perspective in video data). For example, constraining continuity in object location can assist the model in providing reasonable source location assignments for objects in the video data. The constraints may be implemented as a limit on potential changes in state vectors and/or outputs, for example.

The audiovisual upmixing model can be machine-learned (e.g., be or include one or more machine-learned model(s)). For instance, the audiovisual upmixing model can be a self-supervised machine-learned model. In some implementations, the audiovisual upmixing model can be or can include a (e.g., machine-learned) sequence-to-sequence model. A sequence-to-sequence model can be a model that is configured to take a first sequence of data (e.g., audiovisual data) and produce, based on the first sequence of data, a second sequence of data (e.g., upmixed audio data). As examples, the sequence-to-sequence model can be or can include an encoder-decoder model, neural network(s) (e.g., recursive neural networks (RNNs), convolutional neural networks (CNNs), etc.), long short-term memory (LSTM)

model, Transformer model, gated recurrent units (GRU) model, and/or other suitable sequence-to-sequence models or portions thereof. For instance, the sequence-to-sequence model (e.g., encoder-decoder) can map the input audiovisual data to a latent time-series vector representation of the data, which can be used in generating each output channel. For example, the sequence-to-sequence model can intuitively factor locations of objects throughout a scene in the video data, even when the objects are offscreen.

As one example, the audiovisual upmixing model can be or can include an encoder-decoder model, such as an encoder-decoder model including one or more neural networks (e.g., recursive neural networks, convolutional neural networks, linear networks, etc.). For example, the encoder-decoder model can capture contextual information of the input data (e.g., the audiovisual data) as an internal state vector (e.g., an embedding) by providing the input data to an encoder submodel. For instance, in some embodiments, the encoder submodel can include an input channel (e.g., a separate mapping neural network) for each input sequence. For example, the encoder submodel can include separate and/or correlated input channels (e.g., separate neural networks) for audio data and video data included in audiovisual data. Including correlated input channels can allow for the audiovisual upmixing model to learn contextual information present in the video data and associated with the audio data, which can be beneficial for upmixing audio data, especially for two-dimensional video data.

The internal state vector can be provided to a decoder submodel to produce output data (e.g., upmixed audio data) based on the internal state vector. The internal state vector can additionally preserve information from a previous state (e.g., previous input in a sequence), which can allow the sequence-to-sequence model to learn historical information of the input data (e.g., previous visual entities in video data that may be offscreen in a current video frame). The submodels (e.g., the encoder submodel and/or the decoder submodel) can include neural networks, such as recursive neural networks.

In some implementations, the audiovisual upmixing model can include an attention mechanism. The attention mechanism can be configured to allow the audiovisual upmixing model to observe a window of input data, such as more than one entry of input data in a sequence of input data. For example, the window can be a temporal window (e.g., a subset of the sequence of input data). As an example, such as in implementations where the audiovisual upmixing model is an encoder-decoder model, the attention mechanism can include more than one internal state vector that are each provided to the decoder submodel. Additionally and/or alternatively, the attention mechanism can include one or more context vectors. For example, the context vectors can be one or more weighted sums of the internal state vectors. Including a plurality of context vectors and/or internal state vectors can provide deeper understanding of the audiovisual data, including understanding over a longer sequence of time (e.g., to remember information associated with offscreen objects previously in a scene). The context vector can be combined with the internal state vectors and used in place of a single internal state vector (e.g., provided as input to the decoder submodel). Additionally and/or alternatively, the attention mechanism can include an alignment model (e.g., a machine-learned model) that is configured to provide an attention score for an input internal state vector. For example, the attention score can be provided by the alignment model for a particular internal state vector (e.g., combined with a context vector) to determine how important a particular input data entry associated with the internal state vector is.

For example, in some implementations, the audiovisual upmixing model can produce low-dimensional embeddings (e.g., embeddings having fewer than 100 dimensions) of the input audiovisual data. For example, such as in implementations having an encoder-decoder model with an attention mechanism, the embeddings may be produced by the encoder submodel. These embeddings can encode useful information about correlated audio and visual events (e.g., sound with location of a corresponding sound-producing object). The embeddings may be provided to a task-specific machine-learned model (e.g., task-specific layers, such as neural network layers) for various audio tasks that are spatially sensitive. As one example, the embeddings may be provided as input to a sound separation model that produces isolated audio signals, where the encoded video information can be beneficial in separating audio sources. As another example, the embeddings may be provided to a sound source localization model to localize a sound source, where the encoded video information may be beneficial in localizing sound sources. For example, the embeddings may be useful in performing partial and/or complete annotation tasks of high quality audiovisual scenes.

Additionally and/or alternatively, in some implementations, the audiovisual upmixing model can be configured to receive supplementary data associated with the audiovisual data. The supplementary data can be or can include data that supplements audio and/or video data in the audiovisual data. As one example, the supplementary data can include object detection data (e.g., from an object detection model) that is associated with the video data, such as object boundaries (e.g., bounding boxes), object classifications, object tracking (e.g., object trajectories, such as predicted trajectories), camera tracking information, and/or any other suitable supplementary data. In some implementations, however, the audiovisual upmixing model can learn to upmix audio data without requiring this supplementary data, which can be beneficial in reducing additional data processing requirements to derive the supplementary data and/or in cases where such data is unavailable (e.g., for offscreen objects in two-dimensional video). For example, the audiovisual upmixing model can jointly learn to upmix audio data with regard to object detection and tracking (e.g., to upmix audio data with regard to spatial features) without requiring a separate model for these tasks and/or instantiation and/or transfer of data that provides information on these tasks.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for upmixing audiovisual data, the computer-implemented method comprising:
obtaining, by a computing system comprising one or more computing devices, audiovisual data comprising input audio data and video data accompanying the input audio data, wherein each frame of the video data depicts only a portion of a larger scene, and wherein the input audio data has a first number of audio channels;
providing, by the computing system, the audiovisual data as input to a machine-learned audiovisual upmixing model, the audiovisual upmixing model comprising a sequence-to-sequence model configured to model a respective location of one or more audio sources within the larger scene over multiple frames of the video data; and
receiving, by the computing system, upmixed audio data from the audiovisual upmixing model, the upmixed audio data having a second number of audio channels, the second number of audio channels greater than the first number of audio channels.

2. The computer-implemented method of claim 1, wherein the audiovisual upmixing model comprises an encoder-decoder model.

3. The computer-implemented method of claim 1, wherein the audiovisual upmixing model comprises a transformer model.

4. The computer-implemented method of claim 1, wherein the audiovisual upmixing model comprises an attention mechanism.

5. The computer-implemented method of claim 4, wherein the attention mechanism comprises a plurality of context vectors and an alignment model.

6. The computer-implemented method of claim 1, wherein the audiovisual upmixing model comprises a plurality of input streams, each of the plurality of input streams corresponding to a respective audio channel of the input audio data, and a plurality of output streams, each of the plurality of output streams corresponding to a respective audio channel of the upmixed audio data.

7. The computer-implemented method of claim 1, wherein the video data comprises two-dimensional video data.

8. The computer-implemented method of claim 1, wherein the input audio data comprises mono audio data, the mono audio data having a single audio channel.

9. The computer-implemented method of claim 1, wherein the upmixed audio data comprises stereo audio data, the stereo audio data having a left audio channel and a right audio channel.

10. The computer-implemented method of claim 1, wherein the input audio data comprises stereo audio data, the stereo audio data having a left audio channel and a right audio channel.

11. The computer-implemented method of claim 1, wherein the upmixed audio data comprises surround sound audio data, the surround sound audio data having three or more audio channels.

12. The computer-implemented method of claim 1, wherein training the machine-learned audiovisual upmixing model comprises:
obtaining, by the computing system, audiovisual training data comprising video training data and audio training data having the second number of audio channels;
downmixing, by the computing system, the audio training data to produce downmixed audio training data comprising the first number of audio channels;
providing, by the computing system, the video training data and corresponding downmixed audio training data to the audiovisual upmixing model;
obtaining, by the computing system, a predicted upmixed audio data output comprising the second number of audio channels from the audiovisual upmixing model;
determining, by the computing system, a difference between the predicted upmixed audio data and the audio training data; and
updating one or more parameters of the model based the difference.

13. A computing system configured for upmixing audiovisual data, the computing system comprising:
one or more processors; and
one or more memory devices storing computer-readable data comprising instructions that, when implemented, cause the one or more processors to perform operations, the operations comprising:
obtaining audiovisual data comprising input audio data and video data accompanying the input audio data, the input audio data having a first number of audio channels;
providing the audiovisual data as input to a machine-learned audiovisual upmixing model, the audiovisual upmixing model comprising a sequence-to-sequence model; and
receiving upmixed audio data from the audiovisual upmixing model, the upmixed audio data having a second number of audio channels, the second number of audio channels greater than the first number of audio channels.

14. The computing system of claim 13, wherein the audiovisual upmixing model comprises an encoder-decoder model.

15. The computing system of claim 13, wherein the audiovisual upmixing model comprises a transformer model.

16. The computing system of claim 13, wherein the audiovisual upmixing model comprises an attention mechanism.

17. The computing system of claim 16, wherein the attention mechanism comprises a plurality of context vectors and an alignment model.

18. The computing system of claim 13, wherein the audiovisual upmixing model comprises a plurality of internal state vectors.

19. The computing system of claim 13, wherein the audiovisual upmixing model comprises a plurality of input streams, each of the plurality of input streams corresponding to a respective audio channel of the input audio data, and a plurality of output streams, each of the plurality of output streams corresponding to a respective audio channel of the upmixed audio data.

20. The computing system of claim 13, wherein the video data comprises two-dimensional video data.

* * * * *